US009949218B1

(12) United States Patent
Lau

(10) Patent No.: US 9,949,218 B1
(45) Date of Patent: Apr. 17, 2018

(54) MOBILE DEVICE SIGNAL BOOSTER

(71) Applicant: Christopher Lau, Altadena, CA (US)

(72) Inventor: Christopher Lau, Altadena, CA (US)

( * ) Notice: Subject to any disclaimer, the term of this patent is extended or adjusted under 35 U.S.C. 154(b) by 0 days.

(21) Appl. No.: 15/433,972

(22) Filed: Feb. 15, 2017

(51) Int. Cl.
*H04B 1/04* (2006.01)
*H04W 52/52* (2009.01)
*H04W 16/28* (2009.01)

(52) U.S. Cl.
CPC ........... *H04W 52/52* (2013.01); *H04W 16/28* (2013.01)

(58) Field of Classification Search
CPC .. H02J 7/0027; H04M 1/6075; H04M 1/6066; H04M 1/03; H04M 1/0249; H04M 1/0283; H04M 2250/52; H04W 84/18
USPC .............. 455/556.1, 575.9, 90.3, 569.1, 129
See application file for complete search history.

(56) References Cited

U.S. PATENT DOCUMENTS

| 2004/0157650 | A1* | 8/2004 | Wissinger | G07C 5/008 455/569.2 |
| 2010/0151917 | A1* | 6/2010 | Wilson | H04M 1/6075 455/571 |
| 2016/0072933 | A1* | 3/2016 | Cox, III | H04M 1/185 455/575.8 |
| 2017/0047635 | A1* | 2/2017 | Wolentarski | H04B 1/3838 |
| 2017/0055231 | A1* | 2/2017 | Cook | H04W 52/0229 |

* cited by examiner

*Primary Examiner* — Tu X Nguyen
(74) *Attorney, Agent, or Firm* — Lewis Roca Rothgerber Christie LLP

(57) ABSTRACT

A device for boosting a mobile signal corresponding to a mobile device, the device including a cradle for holding the mobile device, a mirrored phone antenna configured to contact the mobile device when placed in the cradle, and configured to receive the mobile signal from the mobile device, a secondary antenna for receiving the mobile signal from the mirrored phone antenna, a booster electronic card for receiving the mobile signal from the secondary antenna, and for boosting the mobile signal, and a directionalized antenna for receiving the boosted mobile signal from the booster electronic card, and for transmitting the boosted mobile signal.

19 Claims, 4 Drawing Sheets

MOBILE DEVICE SIGNAL BOOSTER

FIELD

The disclosed invention relates generally to electronic circuits, and to antenna communication, and relates more specifically to a system and method for improving a signal of a mobile device such as a cell phone.

BACKGROUND

Occasionally, a user of a mobile device may find themselves in a remote or low signal area. If the user wished to improve the reception of their mobile device, wireless mobile phone, or satellite phone, boosting technology has been historically restricted to fixed environments and fixed power sources.

SUMMARY

Some embodiments of the disclosed invention provide portable hardware that is able to safely amplify signals to and from a mobile device attached to the hardware.

In some embodiments, the disclosed invention is a device for boosting a mobile signal corresponding to a mobile device, the device including a cradle for holding the mobile device, a mirrored phone antenna configured to contact the mobile device when placed in the cradle, and configured to receive the mobile signal from the mobile device, a secondary antenna for receiving the mobile signal from the mirrored phone antenna, a booster/signal amplification electronic card for receiving the mobile signal from the secondary antenna, and for boosting the mobile signal, and a directionalized antenna for receiving the boosted mobile signal from the booster electronic card, and for transmitting the boosted mobile signal.

In one embodiment, the device may further include a shielded device body between the secondary antenna and the booster electronic card for shielding a user of the device from the boosted mobile signal.

In one embodiment, the shielded device body is hemi-directional, and is configured to reflect signals toward a rear of the device.

In one embodiment, the secondary antenna includes a secondary universal antenna board including Fractal variant forms.

In one embodiment, the device may further include a battery pack for providing power to the booster electronic card or the mobile device.

In one embodiment, the device may further include a USB port.

In one embodiment, the battery pack is configured to power external devices via the USB port.

In one embodiment, the device may include a wireless charging or inductive charging interface.

In one embodiment, the device may further include a kickstand coupled to a rear of the device with an antenna actuation safety switch allowing closed circuit when kickstand is deployed.

In one embodiment, the device defines a camera port corresponding to a camera lens of the mobile device when in the cradle.

In one embodiment, the device defines an audio port corresponding to a speaker of the mobile device when in the cradle.

In one embodiment, the booster electronic card includes anti-oscillation circuitry.

In one embodiment, the booster electronic card is configured to be coupled to a wired remote antenna.

In one embodiment, the booster electronic card includes a plurality of inputs configured to be connected to a plurality of mobile devices to concurrently boost mobile signals of the plurality of mobile devices.

In one embodiment, the directionalized antenna includes shield material for shielding a user from the boosted mobile signal.

In one embodiment, the device includes offset female sockets, and the directionalized antenna is removable, and includes offset male plugs configured to mate with offset female sockets.

In one embodiment, the directionalized antenna further includes a safety screw down BNC connector.

In some embodiments, the disclosed invention is a handheld device for boosting a mobile signal corresponding to a mobile device, the device including a booster electronic card for receiving a mobile signal from the mobile device, and for boosting the mobile signal, and a directionalized antenna for receiving the boosted mobile signal from the booster electronic card, and for transmitting the boosted mobile signal.

In some embodiments, the disclosed invention is a method of boosting a mobile signal corresponding to a mobile device using a handheld device, the method including receiving the mobile signal from the mobile device, boosting the received mobile signal using a booster electronic card, and transmitting the boosted mobile signal from a directionalized antenna of the handheld device connected to the booster electronic card.

Accordingly, the method and system of embodiments of the present invention are able to amplify signals to and from a mobile device while shielding the user from the amplified device.

BRIEF DESCRIPTION OF THE DRAWINGS

These and other features, aspects, and advantages of the disclosed invention will become better understood with regard to the following description, appended claims, and accompanying drawings.

DETAILED DESCRIPTION

Figure 1:
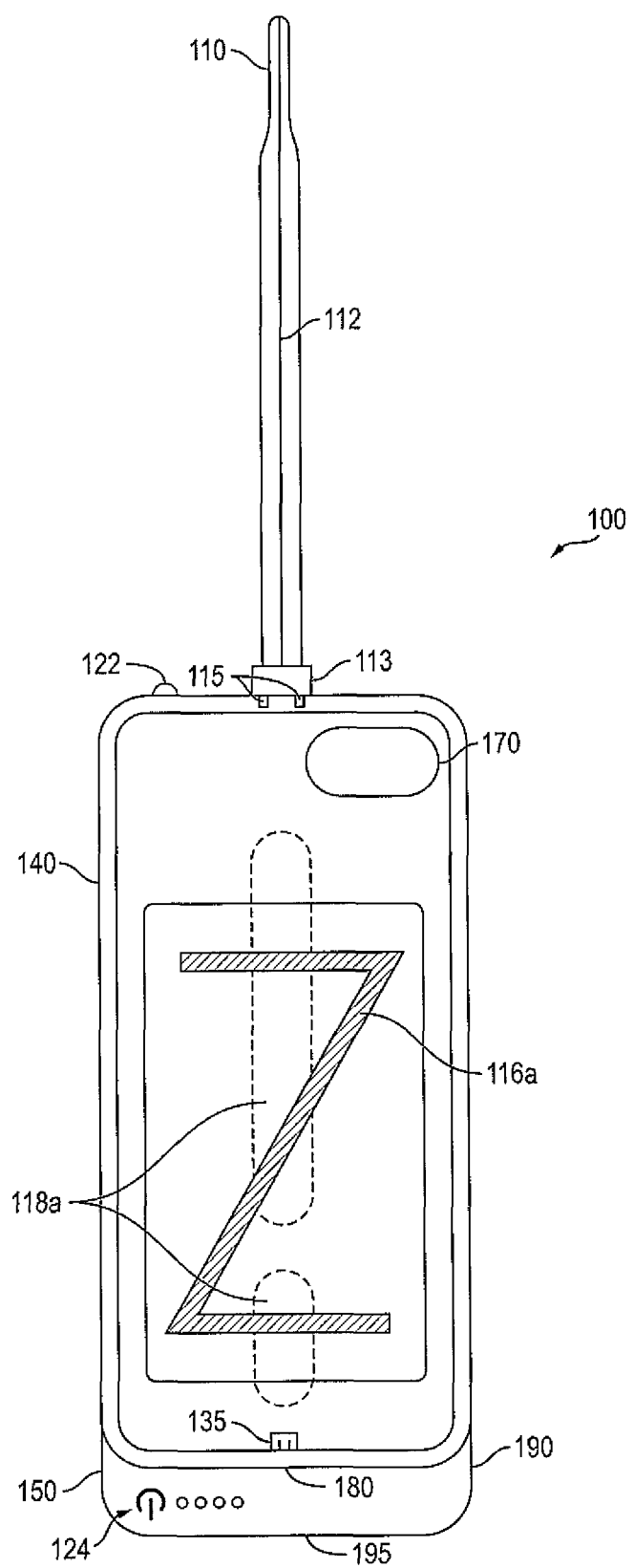
FIG. 1 is a front view of a mobile device signal booster, according to an embodiment of the present invention.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Spatially relative terms, such as "beneath," "below," "lower," "under," "above," "upper," and the like, may be used herein for ease of explanation to describe one element or feature's relationship to another elements) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In some embodiments, the disclosed invention provides a handheld device for physically pairing with a mobile wireless device (e.g., a mobile phone, cellular phone, or satellite phone) to boost/amplify a signal of the mobile device, thereby improving reception of the mobile device. The handheld device may include booster circuitry coupled to an antenna for receiving a mobile signal from the mobile device, and coupled to an antenna for communicating with a cell tower or satellite. Accordingly, the handheld device may boost the received mobile signal, and may transmit the boosted mobile signal to a cell tower.

FIG. 1 is a front view of a mobile device signal booster, according to an embodiment of the present invention.

Referring to FIG. 1, a self-contained wireless signal mobile phone booster, which will be referred to as a Wireless Amplification Signal Phone ("WASP") 100, is shown. The WASP 100 is able to enhance a low or weak wireless signal from a mobile device (e.g., a mobile phone or a cellular phone) placed in a cradle 140 of the WASP 100, and is able to boost, or amplify, the weak wireless signal from the mobile device (e.g., by as much as about 26 decibels) by using boosting technology to enable a user in a low signal area to make voice calls and to access data via the user's mobile signal service provider. Although wireless mobile phone boosting technology has historically been restricted to fixed environments and fixed power sources (e.g., plug-in signal repeaters), because the WASP 100 is a self-contained, hand-held device, the WASP 100 is able to overcome obstacles of portability and appropriate levels of RF absorption by the human body (i.e., by the user). It should be noted that, although the mobile device used with the WASP 100 may generally be a mobile cellular phone, other embodiments of the present invention may be used to boost a mobile wireless signal of any other type of mobile device, such as Wi-Fi hot spots, electronic note books, electronic note pads, texting devices, etc.

The WASP 100 includes the cradle 140 for fitting the mobile device therein. Mobile devices generally transmit a signal via an antenna of the mobile device, which may be generally located on a rear of the mobile device. The cradle 140 receives the signal from the antenna of the mobile device via a direct contact interface/mirror cradle receiving antenna/mirrored phone antenna 118a located on an interior face of the cradle 140 that is configured to contact the rear of the mobile device when the mobile device is inserted into the cradle 140. By using the mirrored phone antenna 118a in direct contact with the mobile device, the WASP 100 is able to reduce RF absorption (Specific Absorption Rate) by the human body (e.g., may reduce RF absorption by a head of a user of the WASP 100 to below 1.6 W/kg). Furthermore, the WASP 100 may contain software and hardware that regulates the boosted output signal transmission to attenuate near field RF exposure to the user. As an example, RF reduction by the WASP 100 may be achieved via one or more safety components, such as a safety closed circuit antenna kickstand switch 177, shielded booster circuitry of a booster electronic card 120, a shielded booster device body 160, a shielded antenna 110, or circuitry for regulating a boosting signal. These features may singularly or in combination reduce the RF absorption by the body of the user (e.g., may reduce RF absorption by a head of a user of the WASP 100 to below 1.6 W/kg).

The mirrored phone antenna 118a additionally allows for lower transmission leakage, as well as lower power usage, due to increased efficiency resulting from direct contact between the mobile device and the mirrored phone antenna 118a when the mobile device is placed in the cradle 140 of the WASP 100. The interface between the mobile device and the mirrored phone antenna 118a can be used passively (e.g., without signal boosting) to provide added signal strength, or can be used in an active boosted mode, which enables increased signal transference from the mobile phone, as described below.

In other embodiments, the cradle 140 may be removable, and differently shaped cradles 140 may correspond to specific models of different phone/mobile wireless communication manufacturers. Each different cradle 140 may have imbedded therein the mirrored phone antenna 118a. By having differently shaped cradles 140, multiple different phones/mobile devices may be used with a same booster board/booster electronic card 120, which is described further below, by simply changing the cradle 140. Furthermore, the passive and active boosting effect of the WASP 100 may be improved, as removable cradles 140 can be designed to match the mirrored antenna of the corresponding mobile device.

Figure 5:
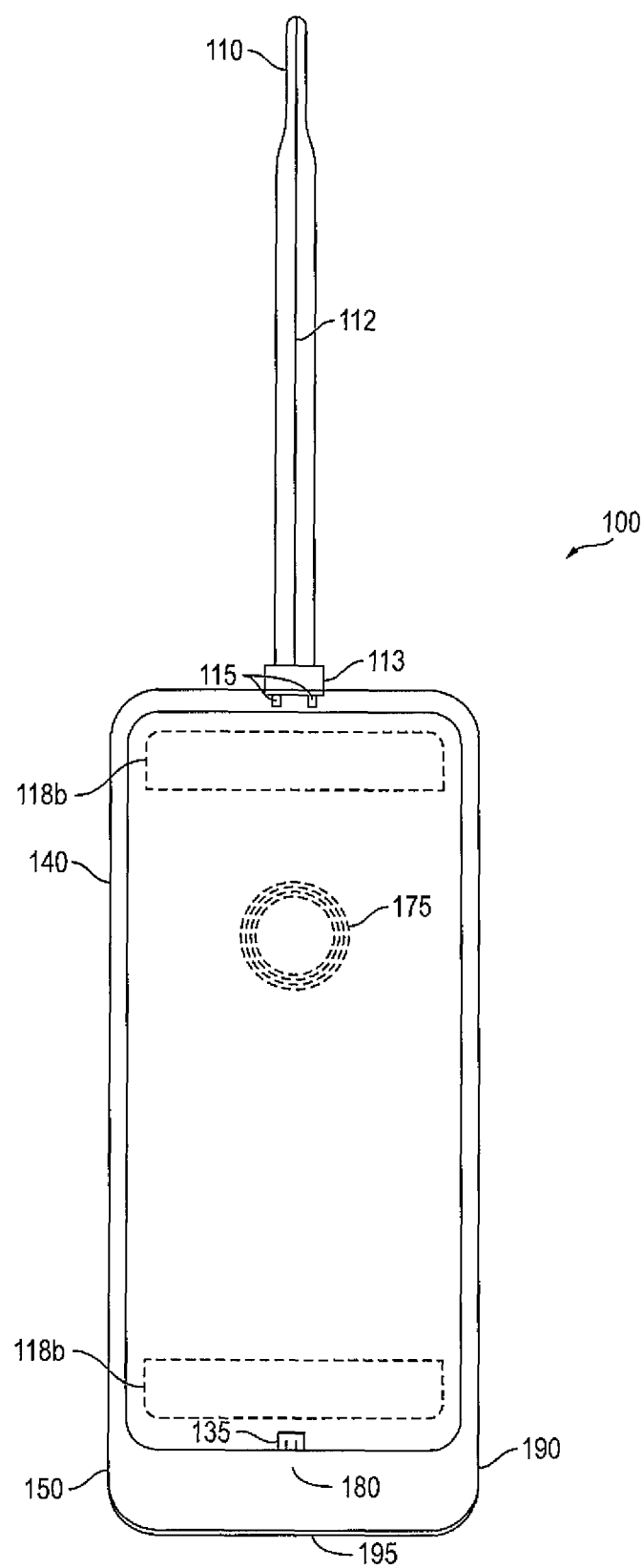
FIG. 5 is a front view of a mobile device signal booster, according to another embodiment of the present invention.

FIG. 5 is a front view of a mobile device signal booster, according to another embodiment of the present invention.

As can be seen in FIG. 5, in other embodiments, the mirrored phone antenna 118b may be differently shaped than the mirrored phone antenna 118a of the embodiment shown in FIG. 1. Just as the cradle 140 may be shaped to correspond to a particular model of mobile device, the mirrored phone antenna 118b may correspond to a model of mobile device that is different than the mirrored phone antenna 118a. That is, the mirrored phone antenna 118 may be shaped or designed to match the shape and location of the antenna of the mobile device.

The cradle 140 may include an adjustable tensioning retention system (e.g., a claw) to improve connection of the mobile device with the cradle 140. Also, the cradle 140 may effectively act as a protective phone case when the cradle 140 is not attached to the booster electronic card 120. Accordingly, the cradle 140 may be attached to the booster electronic card 120 via a rail system including a retention clip to be snapped on to the booster electronic card 120, and may be configured to contact conductive contacts attached to the booster electronic card 120 such that the mirrored phone antenna 118a is electrically connected to the active booster circuitry of the booster electronic card and to a passive antennae of the WASP 100. Furthermore, the removable cradle 140 includes electrical contacts for interfacing with the booster electronic card 120, thereby allowing the mirrored phone antenna 118a to directly connect to the booster electronic card 120. In other embodiments, the cradle 140 can be used to tether the mobile device to the booster electronic card 120 via a wire extension for enabling higher booster capability without the concerns related to energy absorption by the user, as described further below. The removable cradle 140 may also contain an antenna interface port (e.g., an FME port) 126, for allowing direct connection between the mobile device and the booster electronic card 120 via an FME port without use of a direct interface with the mirrored phone antenna 118a. Accordingly, the WASP 100 may include an FME port 126 that may receive direct connection signals from mobile devices that contain antenna ports (e.g., WiFi hotspots, mobile phones, etc.). The removable cradle 140 also enables the booster electronic card 120 to be used alone.

Furthermore, the WASP 100 may optionally include an emergency SOS light-emitting device (e.g., a dome LED) 122 at a top of the WASP 100, as can be seen in FIG. 1. The WASP 100 may also be turned on and off (e.g., turned from passive mode to active mode) by operation of a power button 124 near the bottom of the front of the WASP 100. The power button 124 may also include LED indicators for indicating a power level of a battery pack 130 of the WASP 100, which is described further below.

Figure 2:
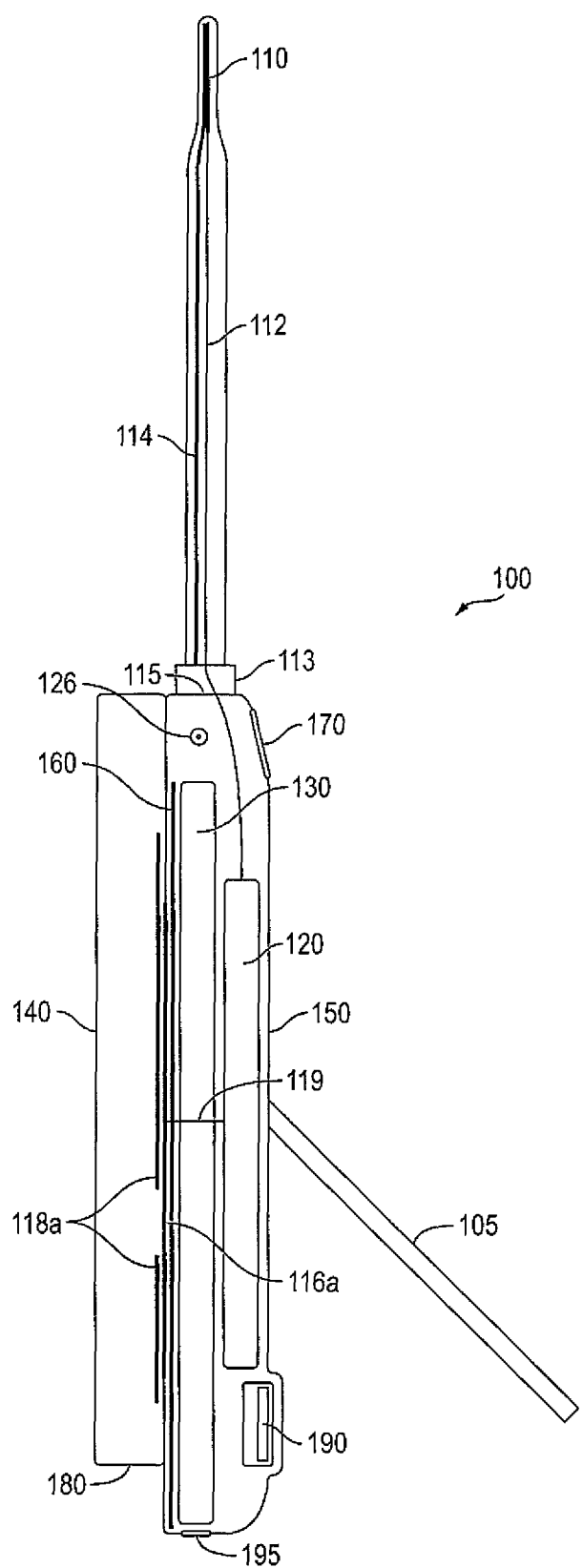
FIG. 2 is a side view of the mobile device signal booster, according to an embodiment of the present invention.

FIG. 2 is a side view of the mobile device signal booster, according to an embodiment of the present invention.

Referring to FIGS. 1 and 2, the cradle 140 of the WASP 100 also includes a secondary antenna (e.g., a secondary Z antenna, or secondary universal Z antenna board) 116 that is able to pick up any scattered transmission from the mobile device antenna (e.g., via contact signal conduction). The secondary antenna 116 enables reception of all assigned frequencies of mobile devices regardless of the manufacturer of the mobile device, and regardless of the mobile signal service provider. Despite having lower efficiency (e.g., when compared to efficiency that would be achieved by direct contact with the mobile phone), the secondary antenna 116 allows capture of proximate mobile device signals (e.g., signals at a distance of up to about 6 feet). The secondary antenna 116 is able to then pass the signal from the mobile phone to a booster board/booster electronic card 120 via a connection 119 to the booster electronic card 120. Thereafter, the booster electronic card 120 is able to send the signal to an antenna (e.g., a directionalized fixed antenna) 110 via an antenna wire 112 contained therein.

Accordingly, the WASP 100 is able to transmit the signal from the mobile device antenna of the mobile device within the cradle 140 of the WASP via the antenna 110 of the WASP 100 (e.g., to transmit the signal to a cell tower). Similarly, the WASP 100 may receive a weak signal from the cell tower, and may boost the received signal track to the mobile device via the mirrored phone antenna 118a and the secondary antenna 116, such that a boosted signal from the cell tower is transmitted to the mobile device.

The booster electronic card 120 used for transmitting the signal of the mobile device received by the secondary antenna 116 to the antenna 110 may include anti-cell tower overload (anti-oscillation) circuitry, such that if oscillations in the signal occur, the anti-oscillation circuitry of the booster electronic card 120 is able to shut down the boosted signal to prevent over amplification of the signal from the cell tower. The anti-cell tower overload circuitry enables the WASP 100 to concurrently capture a selectable number of mobile devices (e.g., two mobile devices). Accordingly, the booster electronic card 120 may have a plurality of inputs corresponding to the number of mobile devices that may be connected thereto (e.g., two mobile device antenna inputs, one for the mirrored phone antenna 118a, and one for the secondary antenna 116). The booster electronic card 120 may be connected to the antenna 110, and may also be connected to a Bayonet Neill-Concelman (BNC) port of a mobile device.

The WASP 100 also includes a booster shielding device/shielded device body 160 to reduce RF transmittance of the boosted signal from the WASP 100 back to the user of the mobile device. The shielded device body 160 is placed between the cradle 140 and other electronics of the WASP 100. The shielded device body 160 may be hemi-directional/hemi-spherical, thereby enabling the boosted signal to be transmitted outwardly, away from the user (e.g., to the cell tower). That is, the shielded device body 160 projects the signal toward the rear of the WASP 100 to allow hemi-spherical boosted signal emission from the WASP 100.

The antenna 110 of the WASP 100 is connected to the booster electronic card 120 via an antenna wire 112 in the antenna 110. The antenna 110 may also include a shield material 114 to reduce RF transmittance to the user by transmitting boosted signals away from the user. Accordingly, the antenna 110 may also be referred to as a shield attached antenna 110 that is, like the shielded device body 160, hemi-directional. Because the antenna 110 with shield material 114 is directionalized, triangulation via cell tower may be not possible.

The antenna 110 may be connected to the WASP 100 with a safety screw down BNC 113 to allow for consistent connection (e.g., such that the shielded side of the antenna 110 having the shield material 114 faces toward the cradle 140). Furthermore, the WASP 100 may also include offset female sockets, while the antenna 110 includes offset male plugs 115 as alignment pins. Accordingly, alignment of the offset male plugs 115 with the offset female sockets ensures that the shield material 114 of the antenna 110 faces toward the cradle 140 (toward a front of the WASP 100), while the emission side of the antenna 110 faces away from the user (e.g., to emit to a rear of the WASP 100), thereby protecting the user. Accordingly, the antenna 110 may be properly connected to the WASP 100 by using the offset male plugs 115 in conjunction with the safety screw down BNC connector/BNC lock design 113, unlike generic antennas, which may not attach to the WASP 100 properly or consistently.

In another embodiment, the antenna 110 may be configured to allow movement of the antenna 110 to thereby further reduce RF exposure to the user. For example, the antenna 110 may include a hinge to allow the antenna 110 to be moved away from the body of the WASP 100 by about 2 inches or more.

In another embodiment, the boosted signal from the WASP 100 may be transmitted via a cabled/wired remote antenna, which may be connected to the WASP 100 to be placed further from the user (e.g., to provide increased signal boosting without risk to the user). For example, the WASP 100 may also include a cell tower connection antenna port. The cell tower connection antenna port may be located at, for example, a top or rear of the mobile device. The cell tower connection antenna port may be connected to the antenna 110. The cell tower connection antenna port may also be connected to the wired remote antenna via the WASP 100. Accordingly, the wired remote antenna may be omni-directional (unlike the shielded antenna 110), and may omit the safety screw down BNC 113 used to connect the antenna 110 to the rest of the WASP 100. Accordingly, the WASP 100 may be connected to a wired remote antenna, thereby allowing the WASP 100 to receive a signal transmitted from a cell tower, and to transmit a further boosted signal, such that the cell tower can receive the boosted signal from the WASP 100. The remote antenna connection allows BNC plug use, but the wired remote antenna is not directionalized, as the antenna is safely far enough away from the mobile device, and is therefore at a safe distance from the user (i.e., the user does not experience high RF absorption corresponding to the boosted signal). In this embodiment, triangulation of the mobile phone signal is possible due to the omnidirectional signal.

Additionally, the WASP 100 may bypass the cradle 140 for mobile devices that don't fit in the cradle 140, or may use a Wi-Fi hotspot to allow the secondary antenna 116 to be the primary element for providing the wireless mobile device signal to the booster circuitry of the booster electronic card 120. A phone, in near proximity, will interface with the booster device via the secondary antenna 116 within the device which will permit the use of an omnidirectional boosting antenna 110 thereby expanding the radial field of reception/transmission while reducing nearfield energy exposure to the user.

Figure 3:
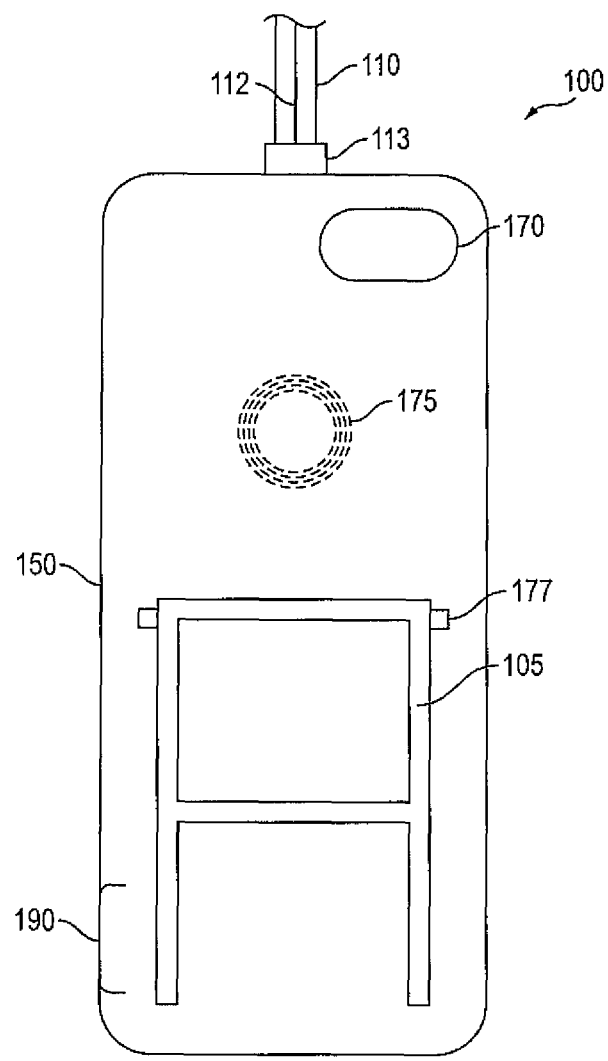
FIG. 3 is a rear view of the mobile device signal booster, according to an embodiment of the present invention.
Figure 4:
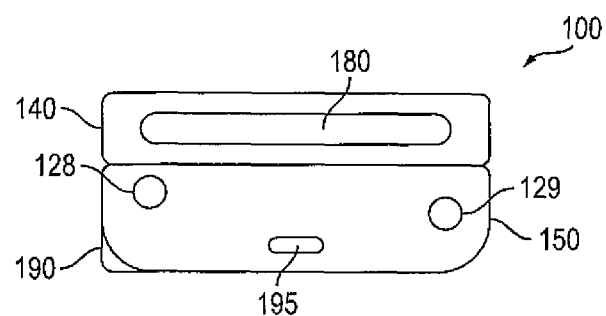
FIG. 4 is a bottom view of the mobile device signal booster, according to an embodiment of the present invention.

FIG. 3 is a rear view of the mobile device signal booster, according to an embodiment of the present invention, and FIG. 4 is a bottom view of the mobile device signal booster, according to an embodiment of the present invention.

Referring to FIGS. 1-4, the WASP 100 also includes a self-contained battery pack 130 as a power source for providing power to the electronics (e.g., the booster electronic card 120) of the WASP 100, such that the WASP 100 is able to omit wires between the WASP 100 and the mobile device. Additionally, the WASP 100 may include an external USB port 190 and a micro USB port 195. Furthermore, the cradle 140 may also include a lightning/fast charging plug 135 that may be integrated with the lightning/fast charging plug input of the mobile device when the mobile device is placed in the cradle, thereby enabling the mobile device to be charged through connection to the WASP 100 via the battery pack 130 of the WASP 100 while still providing power to the electronics of the WASP 100. Additionally, the WASP 100 may include a wireless charging/inductive charging interface 175.

Accordingly, external devices may be connected to the WASP 100 and the mobile device via the external USB port 190 (e.g., a Wi-Fi hotspot, etc.), and the self-contained battery pack 130 may provide power to the external devices connected via the external USB port 190, may provide power to the mobile device via the integrated lightening/fast charging plug 135, and may provide power to the circuitry of the WASP 100. Additionally, the WASP 100 may be charged or powered via the external USB port by using, for example, a continuous power micro USB mini solar panel, a USB DC input, an external battery pack, etc. The battery pack 130 may be removable, thereby enabling the battery pack 130 of the WASP 100 to be changed out with another external battery pack.

Referring to FIGS. 3 and 4, some embodiments of the WASP 100 may also include a kickstand/supporting member 105 at the rear of the WASP 100, which may contain a safety switch 177, which allows use of unshielded omnidirectional antenna when the kickstand 105 is deployed. That is, when the kickstand 105 is deployed, the safety switch 177 closes a circuit to cause activation of the signal amplification of the WASP 100.

The cradle 140 of the WASP 100 may define a passive audio port 180 corresponding to a speaker of the mobile device when in the cradle 140, thereby allowing the WASP 100 to be operated as a hands-free boosted speaker phone. The passive audio port 180 allows sound from the speaker of the mobile device to more easily pass through and to be emitted to the user without being muffled by the WASP 100. Additionally, the WASP 100 may include an illumination device 129 including a light-emitting diode that is located on a bottom of the WASP 100, as shown in FIG. 4. In some embodiments, the illumination device 129 may be pivoted to allow continuous handheld mobile phone use, and may be effectively used as a flashlight. Furthermore, an audio port (e.g., an audio jack port) 128 may be included at a bottom of the WASP 100.

The WASP 100 may also include, or define, an opening passing from the cradle through a rear of the WASP 100. The opening operates as a camera port 170 to allow light access to the camera lens of the mobile device, such that the mobile device may take photos using the camera lens of the mobile device while the mobile device is inserted into the cradle of the WASP 100, and while the WASP 100 is in use.

The WASP 100 may also include one or more light-emitting devices for indicating a power status of the WASP 100 (e.g., the amount of power remaining in the battery pack 130 of the WASP 100). The WASP 100 may also include a power button, such that the signal boosting features of the WASP 100 may be powered down, and such that the mobile device may be used even when the mobile device is contained in the cradle 140 of the WASP 100.

The WASP 100 may also include a wireless charging/induction charging mechanism to include charging external devices as well as charging the WASP 100.

Accordingly, the system and method of embodiments of the disclosed invention described above are better than the conventional systems and methods, because they enable portable mobile phone signal boosting without affecting the operation of any of the features of the mobile phone.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

The invention claimed is:

1. A device for boosting a mobile signal corresponding to a mobile device, the device comprising:
   a cradle for holding the mobile device;
   a mirrored phone antenna configured to contact the mobile device when placed in the cradle, and configured to receive the mobile signal from the mobile device;
   a secondary universal Z antenna board for receiving the mobile signal from the mirrored phone antenna;
   a booster electronic card for receiving the mobile signal from the secondary antenna, and for boosting the mobile signal; and
   a directionalized antenna for receiving the boosted mobile signal from the booster electronic card, and for transmitting the boosted mobile signal.

2. The device of claim 1, further comprising a shielded device body between the secondary antenna and the booster electronic card for shielding a user of the device from the boosted mobile signal.

3. The device of claim 2, wherein the shielded device body is hemi-directional, and is configured to reflect signals toward a rear of the device.

4. The device of claim 1, further comprising a battery pack for providing power to the booster electronic card or the mobile device.

5. The device of claim 4, further comprising a USB port.

6. The device of claim 1, further comprising one or more of a safety closed circuit antenna kickstand switch, shielded booster circuitry, a shielded booster device body, or circuitry for regulating the boosted mobile signal,
   wherein the directionalized antenna is a shielded antenna, and
   wherein the safety closed circuit antenna kickstand switch, the shielded booster circuitry, the shielded booster device body, the circuitry for regulating the boosted mobile signal, and the directionalized antenna are configured to reduce RF absorption by a user.

7. The device of claim 1, further comprising a kickstand coupled to a rear of the device.

8. The device of claim 1, wherein the device defines a camera port corresponding to a camera lens of the mobile device when in the cradle.

9. The device of claim 1, wherein the device defines an audio port corresponding to a speaker of the mobile device when in the cradle.

10. The device of claim 1, wherein the booster electronic card comprises anti-oscillation circuitry.

11. The device of claim 1, wherein the booster electronic card is configured to be coupled to a wired remote antenna.

12. The device of claim 1, wherein the booster electronic card comprises a plurality of inputs configured to be connected to a plurality of mobile devices to concurrently boost mobile signals of the plurality of mobile devices.

13. The device of claim 1, wherein the directionalized antenna comprises shield material for shielding a user from the boosted mobile signal.

14. The device of claim 1, wherein the device comprises offset female sockets, and
   wherein the directionalized antenna is removable, and comprises offset male plugs configured to mate with offset female sockets.

15. The device of claim 1, wherein the directionalized antenna further comprises a safety screw down BNC connector.

16. The device of claim 1, further comprising a kickstand comprising a safety antenna actuator.

17. The device of claim 1, where the device comprises induction/wireless charging circuitry and components.

18. A device for boosting a mobile signal corresponding to a mobile device, the device comprising:

a cradle for holding the mobile device;
a mirrored phone antenna configured to contact the mobile device when placed in the cradle, matching a shape and location of a mobile device antenna of the mobile device, and configured to receive the mobile signal from the mobile device;
a secondary antenna for receiving the mobile signal from the mirrored phone antenna;
a booster electronic card for receiving the mobile signal from the secondary antenna, and for boosting the mobile signal;
a directionalized antenna for receiving the boosted mobile signal from the booster electronic card, and for transmitting the boosted mobile signal; and
a kickstand comprising a safety antenna actuator.

19. A device for boosting a mobile signal corresponding to a mobile device, the device comprising:
a cradle for holding the mobile device;
a mirrored phone antenna configured to contact the mobile device when placed in the cradle, and configured to receive the mobile signal from the mobile device;
a fractal variant secondary antenna for receiving the mobile signal from the mirrored phone antenna;
a booster electronic card for receiving the mobile signal from the secondary antenna, and for boosting the mobile signal; and
a directionalized antenna for receiving the boosted mobile signal from the booster electronic card, and for transmitting the boosted mobile signal.

* * * * *